(12) United States Patent
Partridge et al.

(10) Patent No.: US 6,389,899 B1
(45) Date of Patent: May 21, 2002

(54) IN-PLANE MICROMACHINED ACCELEROMETER AND BRIDGE CIRCUIT HAVING SAME

(75) Inventors: Aaron Partridge; Alissa M. Fitzgerald, both of Palo Alto; Benjamin W. Chui, Sunnyvale; Jospeh Kurth Reynolds, Stanford; Thomas W. Kenny, San Carlos, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/321,061

(22) Filed: May 27, 1999

Related U.S. Application Data

(60) Provisional application No. 60/088,641, filed on Jun. 9, 1998.

(51) Int. Cl.[7] ................................................. G01P 15/12
(52) U.S. Cl. ................................. 73/514.33; 73/514.36
(58) Field of Search .......................... 73/514.33, 514.36, 73/514.23; 338/5, 46

(56) References Cited

U.S. PATENT DOCUMENTS

| | | | |
|---|---|---|---|
| 4,653,326 A | 3/1987 | Danel et al. ............... | 73/517 R |
| 4,891,984 A | 1/1990 | Fujii ......................... | 73/517 R |
| 4,969,359 A | 11/1990 | Mikkor ..................... | 73/517 R |
| 4,981,552 A | 1/1991 | Mikkor ..................... | 156/647 |
| 5,151,763 A | 9/1992 | Marek et al. .................. | 357/26 |
| 5,395,802 A | 3/1995 | Kiyota et al. ................ | 437/228 |

OTHER PUBLICATIONS

Partridge, A. et al., "A high performance planar piezoresistive accelerometer," *IEEE Journal of Microelectromechanical Systems*, (JMEMS), vol. 9, No. 1, Mar. 2000, pp. 58–66.

*Primary Examiner*—John E. Chapman
(74) *Attorney, Agent, or Firm*—Lumen Intellectual Property Services

(57) ABSTRACT

A micromachined accelerometer for measuring acceleration in a direction parallel with the plane of the accelerometer substrate. The accelerometer has a strain-isolation pedestal, a flexure attached to the pedestal, and a proof mass attached to the flexure. The pedestal is wider than the flexure and does not bend when the device is under acceleration. The pedestal serves to isolate the flexure from substrate strain which may be caused by device packaging or temperature variations. Preferably, the joint between the pedestal and flexure, and the joint between the flexure and proof mass are smoothed to prevent stress concentration. The joints have a radius of curvature of at least 1 micron. A piezoresistor is located in one sidewall of the flexure. Alternatively, two piezoresistors are located on the flexure, with one on each sidewall. In this embodiment, a center-tap connection is provided to the point where the two piezoresistors are connected. The present invention includes devices having two accelerometers with Large proof masses and two reference accelerometers having very small proof masses. The four accelerometers are electrically connected in a wheatstone bridge circuit. Also, in the embodiment having two piezoresistors on one flexure, two accelerometers (with a total of four piezoresistors) are electrically connected in a Wheatstone bridge circuit to provide accurate acceleration sensing.

28 Claims, 14 Drawing Sheets

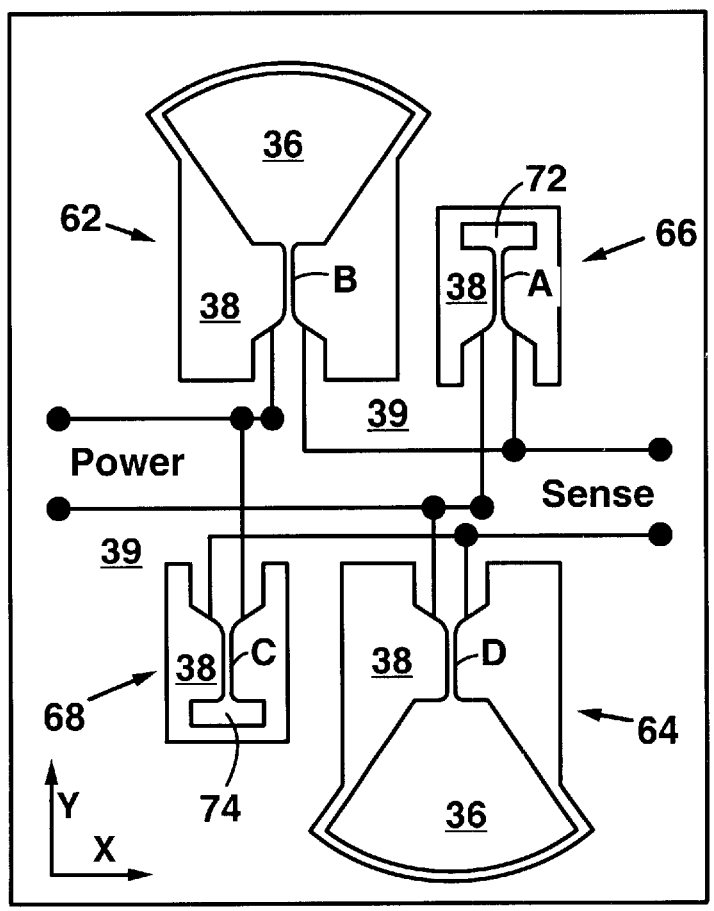
Fig. 8A
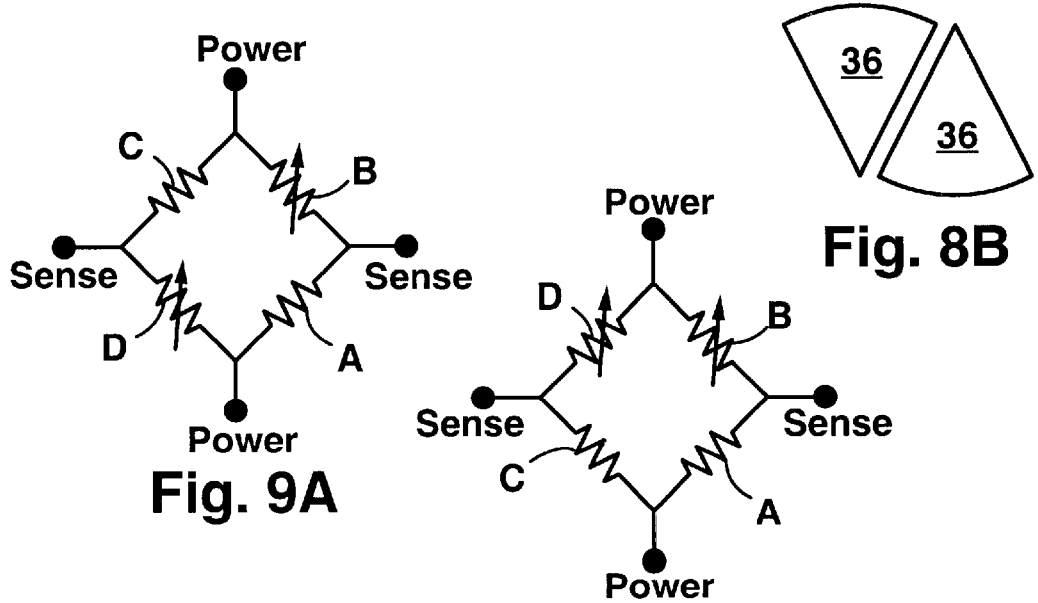
Fig. 8B
Fig. 9A
Fig. 9B

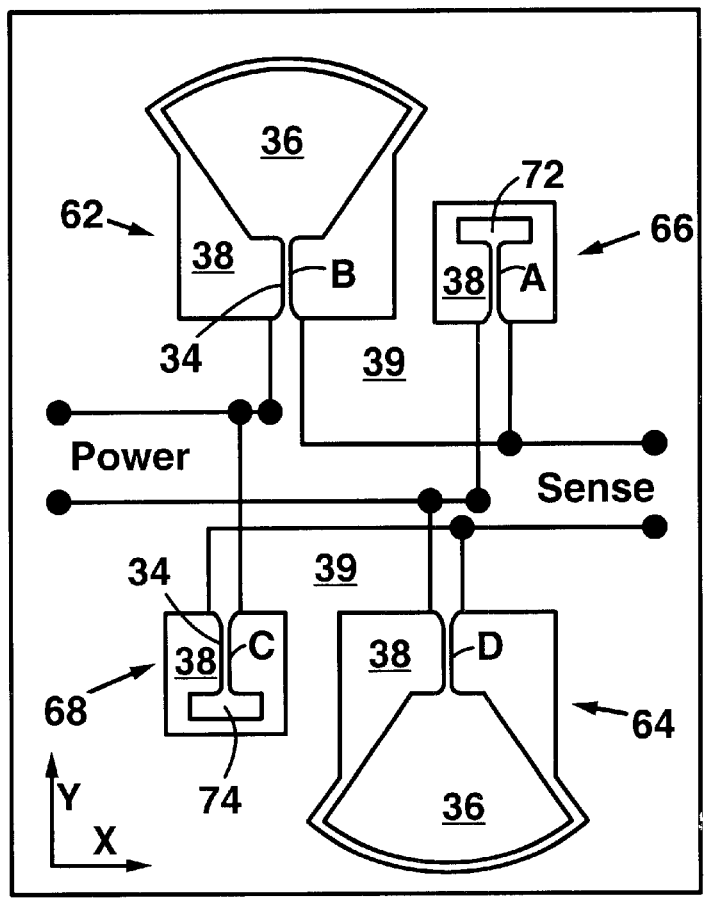
Fig. 9C
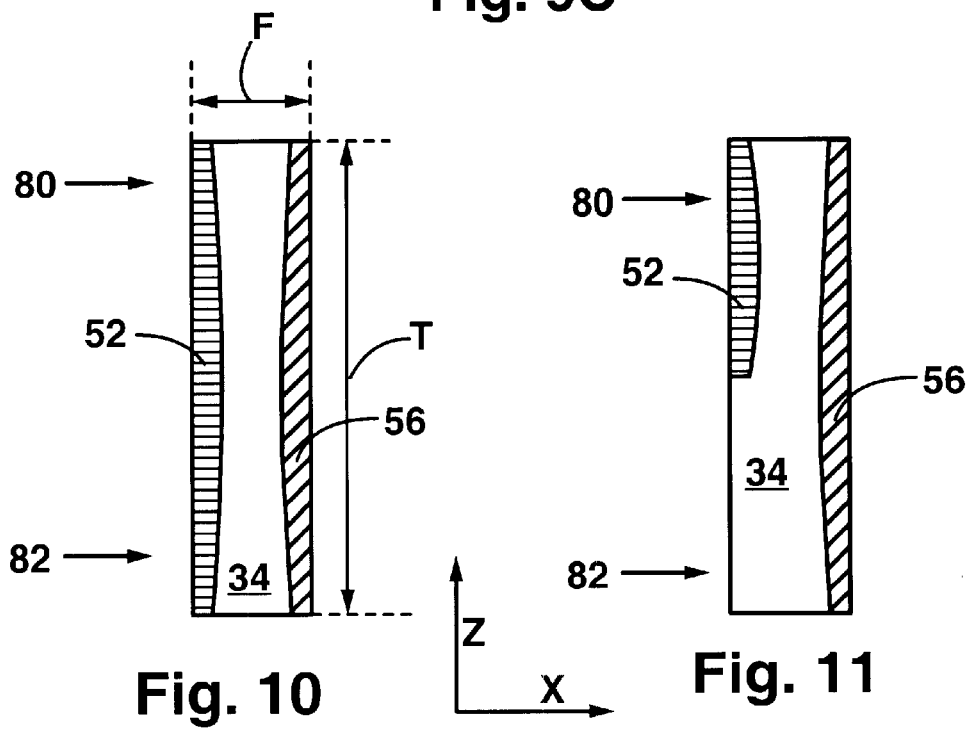
Fig. 10
Fig. 11

IN-PLANE MICROMACHINED ACCELEROMETER AND BRIDGE CIRCUIT HAVING SAME

RELATED APPLICATIONS

This application claims the benefit of provisional patent application 60/088,641 filed on Jun. 9, 1998. The accelerometer of the present invention relies on a high aspect ratio flexure that requires appropriate processing. Two U.S. patent applications, Ser. No. 08/924,427 filed on Aug. 27, 1197 now U.S. Pat. No. 5,958,200 and Ser. No. 08/921,647 also filed on Aug. 27, 1197, now U.S. Pat. No. 6,025,208 address some of the issues of high aspect ratio flexures and methods of making the same and are herein incorporated by reference.

This invention was supported in part by grant number ECS-9502046 from the National Science Foundation (NSF). The Government has certain rights in the invention.

FIELD OF THE INVENTION

This invention relates generally to accelerometers. More particularly, it relates to an accelerometer for measuring acceleration in the plane of a substrate within which the accelerometer is fabricated.

BACKGROUND OF THE INVENTION

Accelerometers are used in a number of automotive, aerospace and sensing applications. Accelerometers are now commonly made from silicon or similar materials using micromachining techniques. FIG. 1 shows a typical accelerometer according to the prior art.

A proof mass 4 is suspended on the free end of a flexure 6. The flexure is supported by a substrate 9. The flexure 6 has a large height 8 and small width 10 so that it is preferentially sensitive to acceleration in an X-direction 12. A strain gauge 13 is located on the flexure 6 so that acceleration is measured. The deflection of the flexure can also be measured capacitively.

Prior art accelerometers sometimes do not have a high enough sensitivity for certain applications. The strain sensitivity can be increased by narrowing the flexure. However, this causes problems because this reduces the area available for the strain gauge. The proof mass can be increased, but this increases the overall size of the device, reducing the number of devices per wafer and increasing the unit cost.

Accelerometers also suffer from 'DC-offsets' due to residual strain in the substrate, to stress induced by packaging techniques, and other fabrication variations (e.g. ion implantation). Strain caused during packaging is particularly burdensome because trimming resistors inside the package cannot be adjusted to compensate. This results; in a relatively wide range of operating characteristics for packaged devices. It would be an advance in the art to reduce DC-offsets in the operating characteristics of micromachined accelerometers.

Also, accelerometers suffer from thermal offsets caused by temperature dependence of the strain gauge and mechanical properties of the flexure. It would be an advance in the art to provide improved methods and structures for reducing temperature dependent effects.

Another important consideration in accelerometer design is the directional sensitivity. For some applications it is important for the accelerometer to only be sensitive to acceleration in a particular direction. The device of FIG. 1, for example, is designed to sense accelerations only in the X-direction 12. However, the device is also sensitive to accelerations in other, orthogonal directions (e.g. acceleration perpendicular to substrate). The device of FIG. 1 has relatively low directional sensitivity. It would be an advance in the art to provide a micromachined accelerometer with improved directional sensitivity.

Yet another consideration in accelerometer design is protecting the flexure from breaking when subjected to very high accelerations. For example, a device can experience an acceleration of 10,000 G's if dropped from a table to a hard floor. It is particularly difficult to provide both high sensitivity, and high tolerance to G-shock.

U.S. Pat. Nos. 4,981,552 and 4,969,359 to Mikkor disclose micromachined accelerometers in silicon made using anisotropic wet etching techniques. The accelerometers are capable of sensing accelerations in three dimensions using three high aspect ratio flexures oriented in three orthogonal planes. A problem with the devices of Mikkor is that, since a wet etch is used, the flexures have very sharp corners. Sharp corners concentrate strain and therefore render the flexures susceptible to breaking under high accelerations. Also, the devices of Mikkor are relatively difficult to manufacture.

U.S. Pat. No. 5,395,802 to Kiyota et al. discloses a micromachined accelerometer for measuring acceleration perpendicular to the substrate. Kiyota does not teach accelerometers that measure acceleration parallel with the substrate.

U.S. Pat. No. 4,653,326 to Danel et al. discloses an accelerometer for measuring acceleration parallel with the substrate. The accelerometer uses a high aspect ratio flexure oriented perpendicular to the substrate surface.

U.S. Pat. No. 5,151,763 to Marek et al. discloses an accelerometer for measuring acceleration parallel with the substrate. The accelerometer is made by appropriately doping the substrate and using a dopant sensitive etch to release the flexures.

U.S. Pat. No. 4,891,984 to Fujii et al. discloses an accelerometer for measuring accelerations in three orthogonal directions using flexures oriented in three orthogonal planes.

Accordingly, it would be an advance in the art to provide an accelerometer having reduced sensitivity to temperature changes and substrate strain. Also, it would be an advance in the art to provide an accelerometer having higher directional sensitivity than provided in prior art devices.

OBJECTS AND ADVANTAGES OF THE INVENTION

Accordingly, it is a primary object of the present invention to provide a micromachined accelerometer that:
1) has a high acceleration sensitivity;
2) is relatively insensitive to substrate strain and strain caused by packaging;
3) is relatively insensitive to errors caused by temperature changes;
4) is sensitive to acceleration in a designated direction and is insensitive to acceleration in orthogonal directions;
5) is caged so that it is protected from G-shock;
6) has a relatively high resonant frequency;
7) is relatively insensitive to rotational acceleration;
8) is easily manufactured at low cost;
9) has a low noise floor compared to signal level.

These and other objects and advantages will be apparent upon reading the following description and accompanying drawings.

SUMMARY OF THE INVENTION

These objects and advantages are attained by a micromachined accelerometer having a base layer, an unreleased portion with a hole, a strain-isolation pedestal, a flexure and a proof mass. The unreleased portion is disposed on top of the base layer. The strain-isolation pedestal is attached to the unreleased portion extending into the hole. The flexure is attached to the pedestal, and the proof mass is attached to the free end of the flexure. The flexure has a high aspect ratio and is oriented to bend in the plane of the base layer. The flexure is narrower than the pedestal. The strain-isolation pedestal serves to isolate the flexure from residual stress in the base layer and surrounding unreleased portion. The pedestal, flexure and proof mass are released from the base layer so that the proof mass is free to move when the flexure bends.

The present invention includes certain preferred size dimensions for the strain-isolation pedestal as a function of the flexure thickness and other dimensions. For example, the strain-isolation pedestal preferably has a width W in a range 2F<W<4T, where F is a thickness of the flexure, and where T is a thickness of the strain-isolation pedestal. Also preferably, the strain-isolation pedestal has a length D in a range 0.5T<D<2W, where T is a thickness of the strain-isolation pedestal, and where W is a width of the strain-isolation pedestal.

The flexure can have an aspect ratio in the range of about 3–30. The flexure can have a thickness in the range of about 2–8 microns. Preferably, joints between the flexure and pedestal, and between the flexure and proof mass are rounded and have a radius or curvature of at least 0.25 F. Alternatively, the joints have a radius of curvature of at least 1 micron.

Preferably, the flexure has a piezoresistor located in a sidewall of the flexure. Also preferably, the piezoresistor is confined to the upper ½ of the flexure. More preferably, the piezoresistor is confined to the upper 1/10 of the flexure.

The present invention also includes a Wheatstone bridge circuit having two accelerometers and two reference accelerometers. The accelerometers have relatively large proof masses, and the reference accelerometers have relatively small proof masses. The accelerometers and reference accelerometers may or may not have strain-isolation pedestals. Each accelerometer and each reference accelerometer has a single piezoresistor. The four piezoresistors are connected in a wheatstone bridge so that high sensitivity to, linear acceleration is provided. The piezoresistors can also be connected in a wheatstone bridge so that high sensitivity to rotational acceleration is provided. Preferably, the accelerometers and reference accelerometers are oriented antiparallel in pairs.

The present invention also includes an accelerometer having a base, an unreleased portion disposed on the base an having a hole, a strain-isolation pedestal attached to the unreleased portion, a flexure attached to the pedestal and a proof mass attached to the flexure. The pedestal, flexure and proof mass are released from the base. The accelerometer has two piezoresistors in the opposing sidewalls of the flexure. The piezoresistors are electrically connected in series. A center tap connection is electrically connected to the point where the piezoresistors are connected. Preferably, the center-tap connection is provided by a heavily doped path extending along a top of the flexure. This arrangement provides for high sensitivity to accelerations perpendicular to the flexure, and high rejection of accelerations in other directions. The strain-isolation pedestal in this embodiment is optional.

Preferably, the piezoresistors are confined to the upper ½ of the flexure.

The accelerometer having two piezoresistors can be electrically connected with a second such accelerometer in a Wheatstone bridge circuit. The wheatstone bridge circuit has certain sensitivity advantages.

DESCRIPTION OF THE FIGURES

FIG. 8A shows a wheatstone bridge circuit having four accelerometers.

FIG. 8B shows a preferred arrangement for accelerometers in the device of FIG. 8A.

FIG. 9A shows an electrical equivalent schematic of the circuit of FIG. 8A.

FIG. 9B shows an electrical schematic of an alternative electrical arrangement for the device of FIG. 8A.

FIG. 9C shows an alternative embodiment where the Wheatstone bridge accelerometers do not have a strain-isolation pedestal.

FIGS. 10 and 11 show cross sectional view of the flexure according to two embodiments of the present invention.

DETAILED DESCRIPTION

Figure 2:
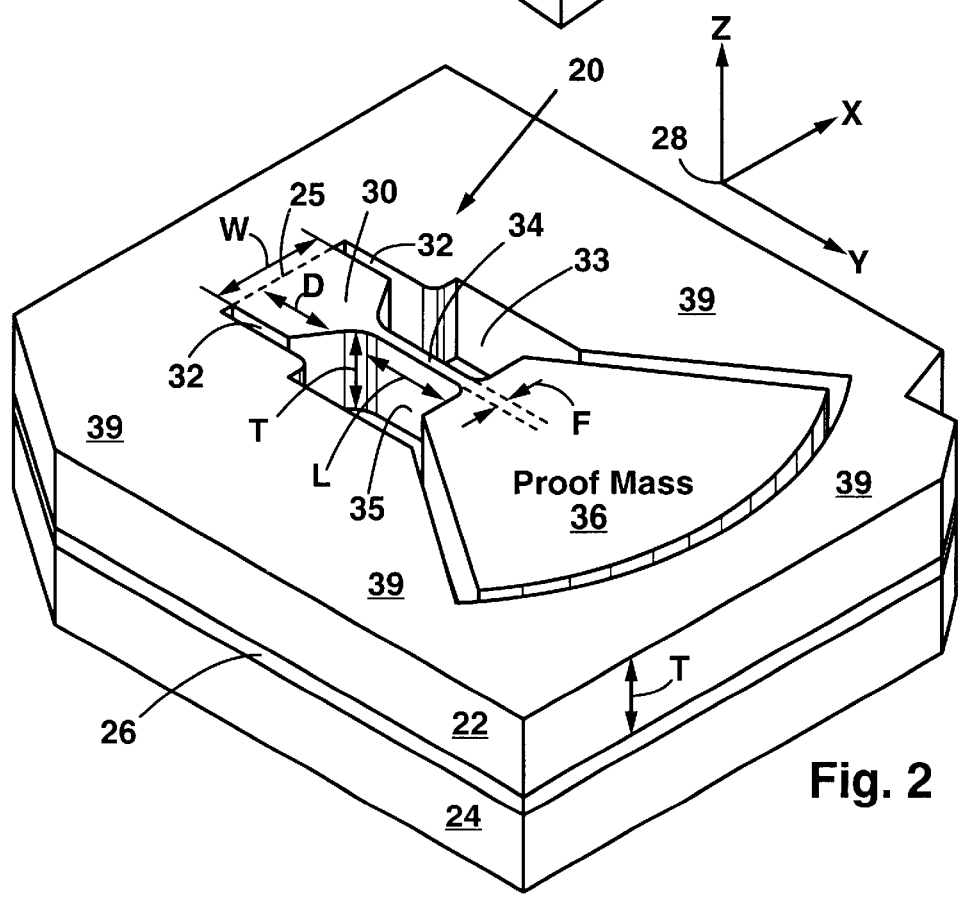
FIG. 2 shows an accelerometer according to a preferred embodiment of the present invention.

FIG. 2 shows a preferred embodiment of an accelerometer 20 according to the present invention. The accelerometer 20 is preferably made from a device layer 22 of a bonded etched silicon-on-insulator (BESOI) wafer. The crystal orientation of the device layer can be (100), for example. The wafer has a base layer 24 (sometimes called the 'handle') which may be relatively thick (e.g. 300 microns), and a buried oxide layer 26. The device layer 22 may be about 5–50 microns thick, for example. The thickness of the device layer 22 is T. Coordinate system 28 sets forth the X, Y, and Z directions for accelerometer 20. The accelerometer 20 is sensitive to acceleration in the X-direction.

The accelerometer 20 of the present invention has a strain-isolation pedestal 30 which extends into hole 33. The shape of the strain-isolation pedestal 30 is defined by strain isolation notches 32. A high-aspect ratio flexure 34 is attached to the strain-isolation pedestal 30. The flexure 34 is narrower (in the X-direction) than the pedestal 30. The flexure 34 has sidewalls 35. Piezoresistors (not shown) are located in the sidewalls 35 for measuring bending of the flexure 34. A proof mass 36 is attached to the flexure 34. The proof mass preferably has a pie piece shape as shown. The pie piece shape results in high acceleration sensitivity because the center of gravity of the pie piece shape is relatively far from the flexure 34.

The proof mass 36, flexure 34, and pedestal 30 are all released from the base layer 24, and are solely supported by the pedestal 30. In a preferred embodiment, the buried oxide layer 26 is etched away from under the pedestal, flexure and proof mass. The Z-direction extent of the pedestal, flexure, and proof mass is equal to the device layer thickness T.

The accelerometer 20 is surrounded by an unreleased portion 39. The unreleased portion 39 acts as a mechanical stop for the proof mass 36. This prevents the flexure 34 from excessive bending, thereby enabling the device to tolerate G-shock in the X-direction.

The pedestal 30 has a width W and a length D. The flexure 34 has a thickness F. Preferably, the flexure thickness F is about 1–10 microns. Thinner flexures are usable, and it is anticipated that future improvements in micromachining will permit the fabrication of thinner, higher aspect ratio flexures 34. The flexure has a length L, which can be in the range of about 5–50 microns (i.e. with a flexure about 1–10 microns thick). A short flexure length L is desirable because it provides high resonant frequencies. Thinner flexures can have proportionately shorter lengths. Preferably, the flexure 34 has an aspect ratio (height in the Z-direction/thickness F) in the range of 3–30. Preferably, the width W is within the range 2F<W<4T. Also, the pedestal length D is preferably in the range 0.25T<D<4W. The length D is generally defined herein as the length of the pedestal midway between the flexure 34 and notches 32. The length D is measured from the end of the pedestal, indicated by line 25.

Figure 3:
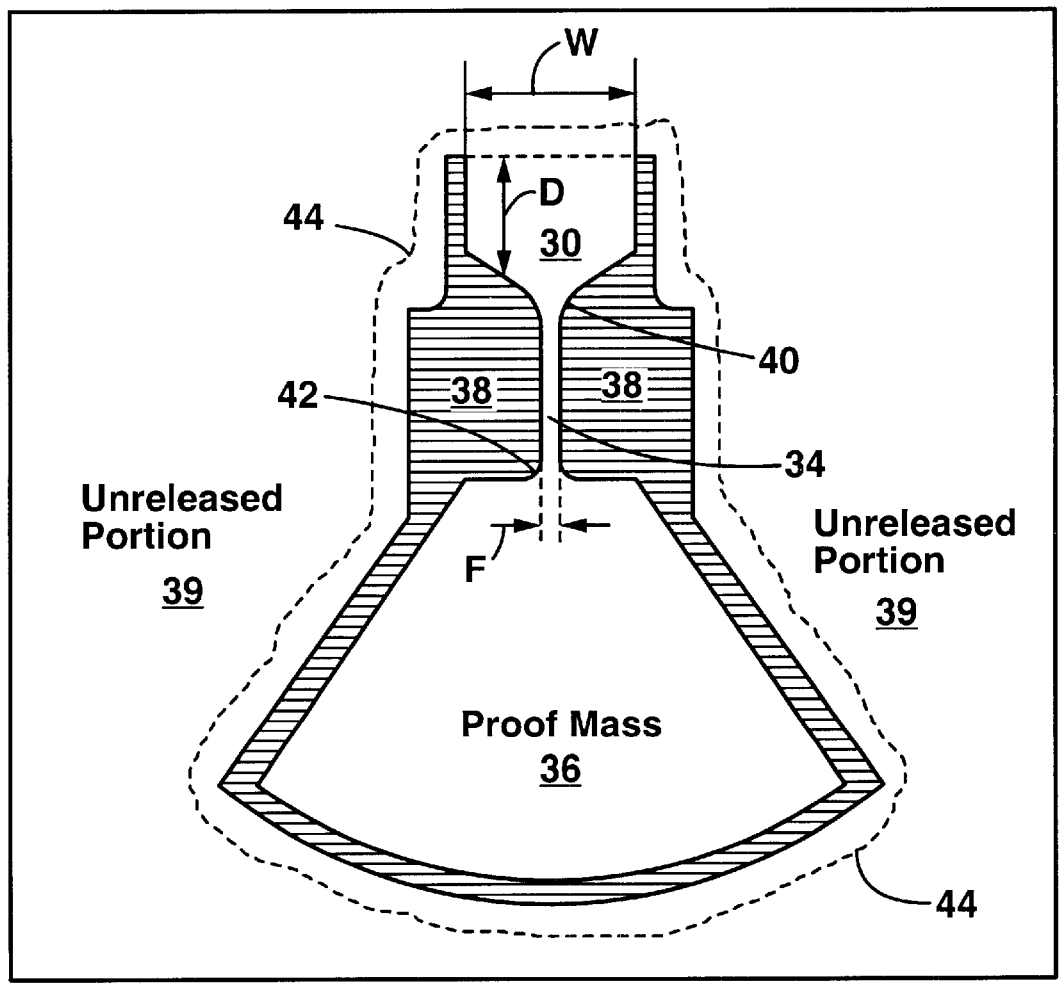
FIG. 3 shows a top view of the accelerometer of FIG. 2.

FIG. 3 shows a top view of the accelerometer 20. Hatched portion 38 is etched to the base layer 24. The accelerometer 20 is essentially an extrusion of the shape shown in FIG. 3. A joint 40 between the pedestal 30 and flexure 34 has a smooth, rounded shape. Similarly, a joint 42 between the flexure and proof mass 36 has a smooth, rounded shape. Preferably, the joints 40, 42 have a radius of curvature greater than 0.25 F. The joints 40, 42 can have a radius of curvature greater than about 0.5 microns, more preferably, greater than about 1 micron.

Area within dotted line 44 generally illustrates the portion of the device layer 22 released from the base layer 24.

Figure 4:
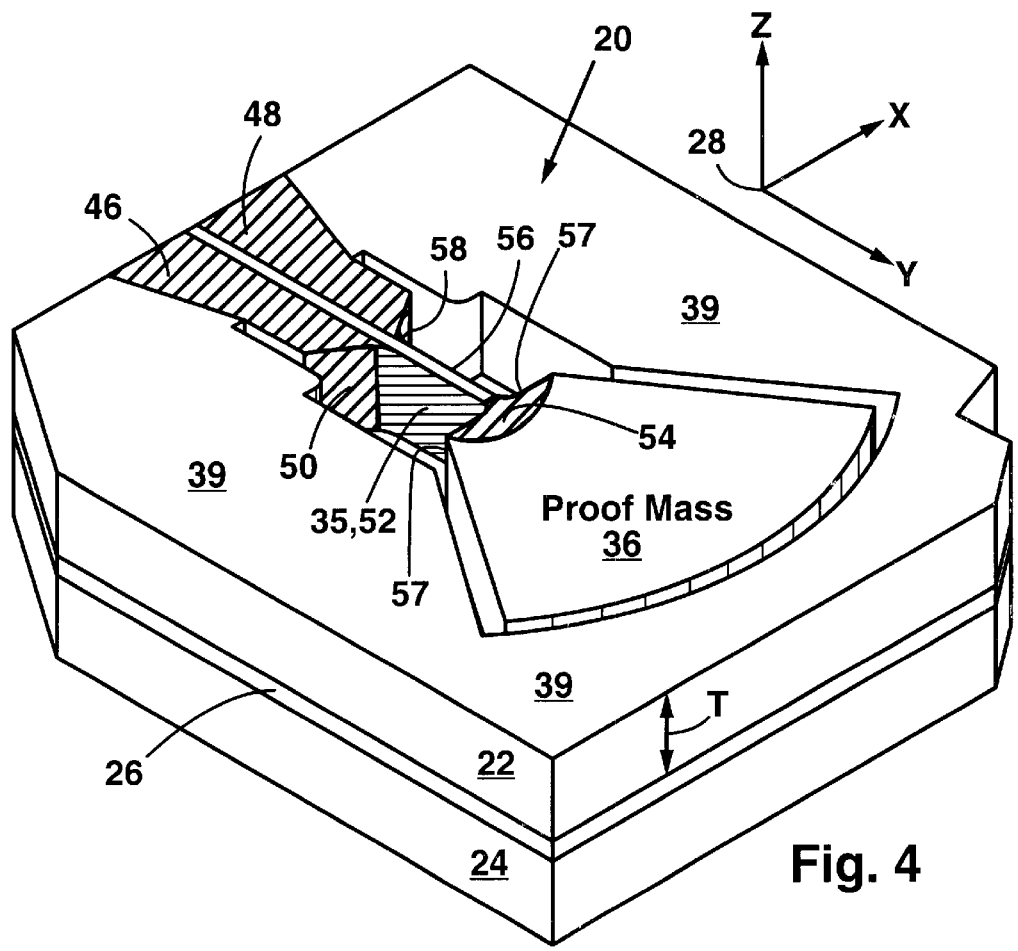
FIG. 4 shows a view of the accelerometer of FIG. 2 illustrating the electronic structure.

FIG. 4 shows another view of the accelerometer 20 illustrating the electronic structure. Contact regions 46, 48 are heavily doped (e.g. n+ or p+ to 200 Ohms/Square) and have no significant piezoresistive characteristics. End cap 50 of the pedestal is also heavily doped. Sidewall 35 is lightly doped and forms a piezoresistor 52. The piezoresistor 52 may cover the entire sidewall 35, or only a portion of the sidewall. Proof mass 36 has a heavily doped region 54, and heavily doped sidewalls 57 (not visible in FIG. 4). Region 54 extends down to vertical sidewalls of the proof mass not visible in FIG. 4. A heavily doped region 56 is disposed on a flexure sidewall (not visible in FIG. 4) opposite from piezoresistor 52. End cap 58 is heavily doped. Areas of the device layer 22 outside of regions 46, 48, 50, 52, 54, 56, 57 and 58 should have an opposite conductivity type compared to regions 46, 48, 50, 52, 54, 56, and 58 so that contacts 46 and 48 are electrically connected only through the piezoresistor 52. Contacts 46, 48 connect to metallic electrical connections (not shown) located a substantial distance (e.g. 100–500 microns) from the accelerometer 20.

It is important not to use metallic conductors (e.g. aluminum) near the flexure. This is because the different thermal expansion characteristics of the metal and accelerometer material cause stress in the flexure and hence errors in acceleration measurements. It is preferred to use only heavily doped regions for conductors close to the flexure.

Figure 5:
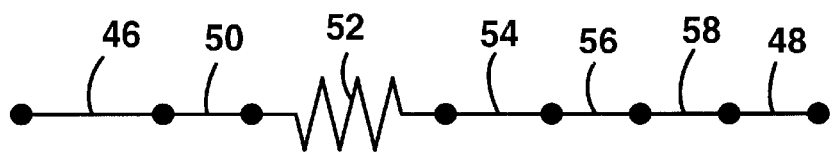
FIG. 5 shows the electrical circuit in the accelerometer of FIGS. 2 and 3.

FIG. 5 schematically illustrates the connections between regions shown in FIG. 4. Regions 46, 48, 50, 52, 54, 56, 57 and 58 form an electrical circuit that has a resistance largely determined by the resistance of the piezoresistor 52. The resistance of the piezoresistor changes as the flexure 34 flexes under inertial forces from the proof mass 36 when subject to acceleration in the X-direction. Preferably, all the heavily doped regions have as high a resistance as possible so that the resistance of the circuit is determined by the piezoresistor 52.

Figure 1:
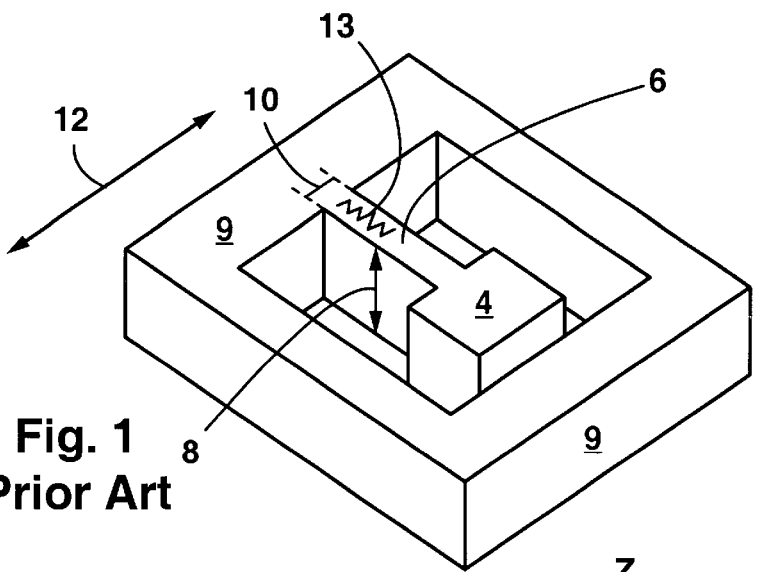
FIG. 1 (Prior Art) shows an accelerometer according to the prior art.

The strain-relief pedestal 30 serves an important function in the present invention. Often, wafers (e.g. wafers made of silicon or other semiconductors) are warped and have built-in stress (substrate stress). In BESOI wafers, substrate stress can be in the base layer 24. Also, packaging substrate stress. If the flexure is directly attached to the unreleased portion (e.g. as in the prior art device of FIG. 1), substrate stress affects the stress in the flexure. The pedestal 30 performs the function of isolating stress in the flexure from substrate stress.

Offset errors due to substrate stress are often corrected by laser trimming of resistors connected to strain sensors in the flexure. However, substrate stress is altered by packaging. After packaging, laser trimming is impossible, so offset errors are present in finished devices. The pedestal 30 reduces the effect of offset errors due to packaging.

In order for the pedestal 30 to provide this benefit, the pedestal should have width W is within the range 2F<W<4T and length D in the range 0.25T<D<4W. A pedestal with a width greater than 4T will generally be subject to stress, thereby coupling the stress to the flexure; a pedestal with a width less than 2F will generally not provide isolation and will flex along with the flexure. A pedestal with a length greater than 4W generally will not provide additional benefit over a shorter pedestal; a pedestal with a length less than 0.25T will generally not provide enough stress isolation for the flexure. More preferably, the width W is in the range 4F<W<2T, and the length D is in the range of 0.5T<D<2W.

It is important to note that the recommended size ratios for W, D, T, and F scale with accelerometer size. Although it is presently preferred for the thickness T to be in the range of about 5–50 microns (30 microns has been commonly used), and the flexure thickness F to be in the range of 1–10 microns, future improvements in micromachining may make much smaller devices practical. For example, in future devices, the flexure thickness F may be 0.5–1 micron, and the thickness T may be less than 10 microns.

Figure 6A:
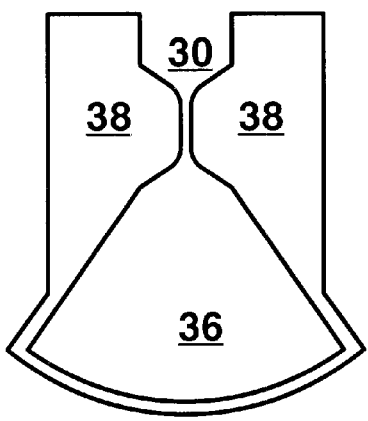
FIGS. 6A–6D show several variations of the present invention.
Figure 6B:
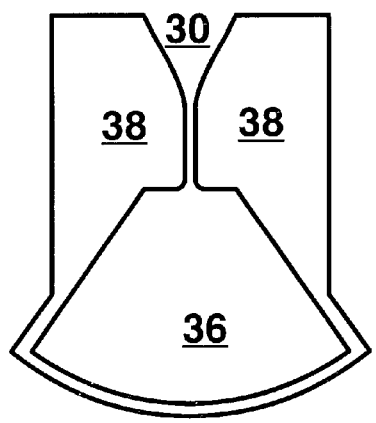
Figure 6C:
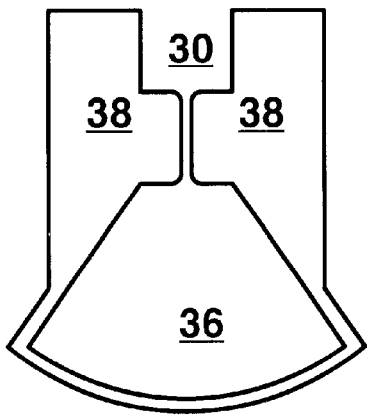
Figure 6D:
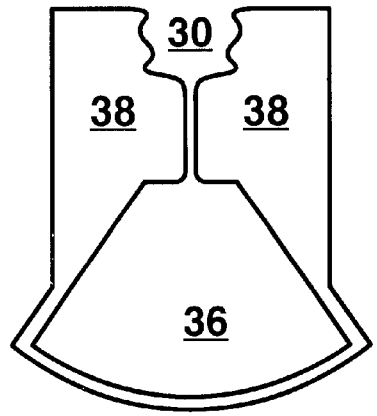
Figure 7:
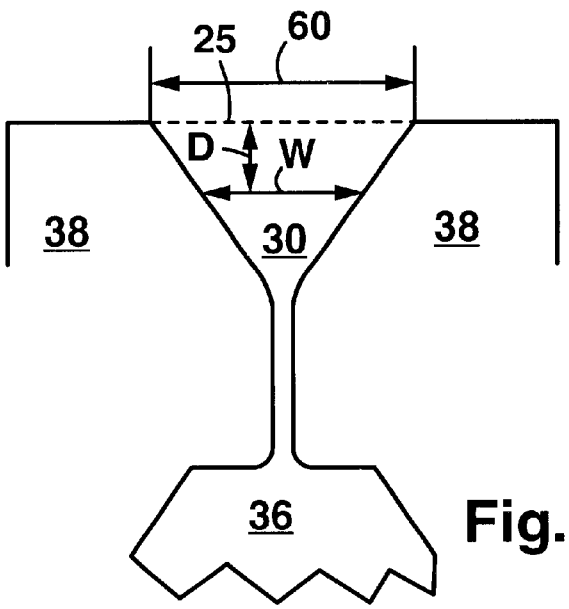
FIG. 7 shows a closeup view of the pedestal in an alternative embodiment of the invention

It is also important to note that the accelerometer does not need to have the exact shape shown in FIGS. 2–4. Many variations are possible within the scope of the present invention. FIGS. 6A–6C, for example show several variations within the scope of the present invention. All of these designs provide the benefit of stress isolation for the flexure. FIG. 6D shows a very arbitrary shape for the pedestal that provides stress isolation. FIG. 6B shows an embodiment where the pedestal 30 has a triangular shape. In such embodiments, the width W and length D are defined as shown in FIG. 7. The width W is ½ a full width 60, and the length D is the distance from where the width W is ½ the full width 60 to the line 25.

FIG. 8A shows a particularly useful Wheeatstone bridge circuit having two accelerometers 62, 64 and two reference accelerometers 66, 68. Accelerometer 62 and accelerometer 64 are oriented antiparallel (i.e. 'facing' opposite directions, but sensitive to acceleration in the same X-direction); reference accelerometer 66 and reference accelerometer 68 are oriented antiparallel. Reference accelerometer 66 is oriented parallel with accelerometer 62; reference accelerometer 68 is oriented parallel with accelerometer 64. FIG. 8B shows a preferred arrangement in which accelerometers are located side by side in antiparallel arrangement so that the footprint size of the device is minimized.

The reference accelerometers 66, 68 have very small proof masses 72, 74, and are therefore quite insensitive to acceleration compared to the accelerometers 62, 64. Preferably, the proof masses 72, 74 are just large enough to accommodate a heavily doped region 54 as shown in FIG. 4. In all other respects, the accelerometers 62, 64 and the reference accelerometers 66, 68 are identical. The flexures, pedestals, doping characteristics, and piezoresistors are identical in the accelerometers and reference accelerometers. Accelerometers 62, 64, 66, 68 have piezoresistors B, D, A, and C, respectively. Piezoresistors A, B, C, and D are located on the same corresponding sides of flexures as shown (i.e. A, B, C and D face the positive X-direction). The piezoresistors are electrically connected in a Wheatstone bridge as shown in FIG. 9A. This arrangement provides high sensitivity to X-direction acceleration, and rejection of signals from rotational acceleration (about any axis: an X, Y, or Z axis). A further advantage of locating the piezoresistors in the same sides of the flexures is that all the piezoresistors A, B, C, D can be made in the same ion implantation step, thereby assuring the phiezoresistors have very similar characteristics.

Additionally, the device of FIG. 8A provides rejection of signals caused by Z-direction acceleration because the piezoresistors A, B, C, and D all respond in the same sense to Z-direction acceleration. Accelerations in the Y-direction do not result in significant resistance changes.

Alternatively, the piezoresistors are connected as shown in FIG. 9B. This arrangement provides rejection of signals resulting from acceleration in the X-direction, and provides high sensitivity for rotational acceleration (about any axis).

Alternatively, the piezoresistors are located on correspondingly opposite sides of the flexures. For example, piezoresistors A and B are facing the positive X-direction, and piezoresistors C and D are facing the negative X-direction. In this case, if the piezoresistors are connected as shown in FIG. 9A, the bridge circuit is most sensitive to rotational acceleration, and insensitive to X-direction acceleration. If the piezoresistors are connected as shown in FIG. 9B, the bridge circuit is most sensitive to X-direction acceleration, and is insensitive to rotational acceleration.

The piezoresistors A, B, C, D are preferably made simultaneously in the same processing steps to ensure they are as similar as possible. Resistance offsets and resistance variations caused by temperature changes and substrate stress are minimized due to the identical characteristics of the piezoresistors A, B, C, D.

Optionally, a third reference accelerometer in combination with additional circuitry can be used for further improved temperature compensation.

In the embodiment of FIG. 8A, the strain-isolation pedestals 30 are preferred but optional. FIG. 9C shows an alternative embodiment of the present invention having accelerometers and reference accelerometers without strain-isolation pedestals. The embodiment of FIG. 9C is the same as that shown in FIG. 8A, except that no strain-isolation pedestals are present. The flexures 34 are directly connected to the unreleased portion 39.

FIG. 10 shows a cross sectional view of the flexure 34 of FIGS. 2–4. The piezoresistor 52 extends the entire height T of the flexure. When subject to acceleration in the positive Z-direction, an upper portion 80 of flexure is under compression, and a lower portion 82 is under tension. Therefore, the resistances of the upper portion 80 and lower portion 82 change oppositely. If the current flow is uniform over height T, the total resistance of the piezoresistor remains relatively unchanged during Z-acceleration. However, in certain cases, current flow through the piezoresistor (in the Y-direction) is not uniform across the height T. For example, nonuniform current flow can be caused by nonuniform doping of heavily doped region 50 (from FIG. 4). Also, nonuniform current flow can be caused by non-uniform doping of piezoresistor 52. If the current is not uniform across the height T, the accelerometer is sensitive to acceleration in the Z-direction. Therefore, in a single accelerometer not connected in a Wheatstone bridge, it is highly desirable for the current to be uniform across the height T of the piezoresistor.

FIG. 11 shows an alternative embodiment where the piezoresistor is confined to the upper portion 80 of the flexure. For example, the piezoresistor can be confined to the upper ⅒ or ½ of the flexure. An advantage of confining the piezoresistor to the upper portion is that a higher-quality piezoresistor can be made in the upper portion 80. This is because dry etching processes (e.g. deep reactive ion etching, or DRIE) often cause damage to the lower portion 82 of the flexure. Also, confining the piezoresitor increases the resistance of the piezoresistor, which decreases the effect of other resistances in the circuit, thereby making the device more sensitive and stable.

However, the piezoresistor 52 confined to the upper portion 80 will have a greatly increased sensitivity to acceleration in the Z-direction, which is undesirable. Therefore, if the piezoresistor is confined to the upper portion 80, the accelerometer definitely should be combined with other accelerometers in a Wheatstone bridge circuit as shown in FIGS. 8 and 9A.

Figure 12A:
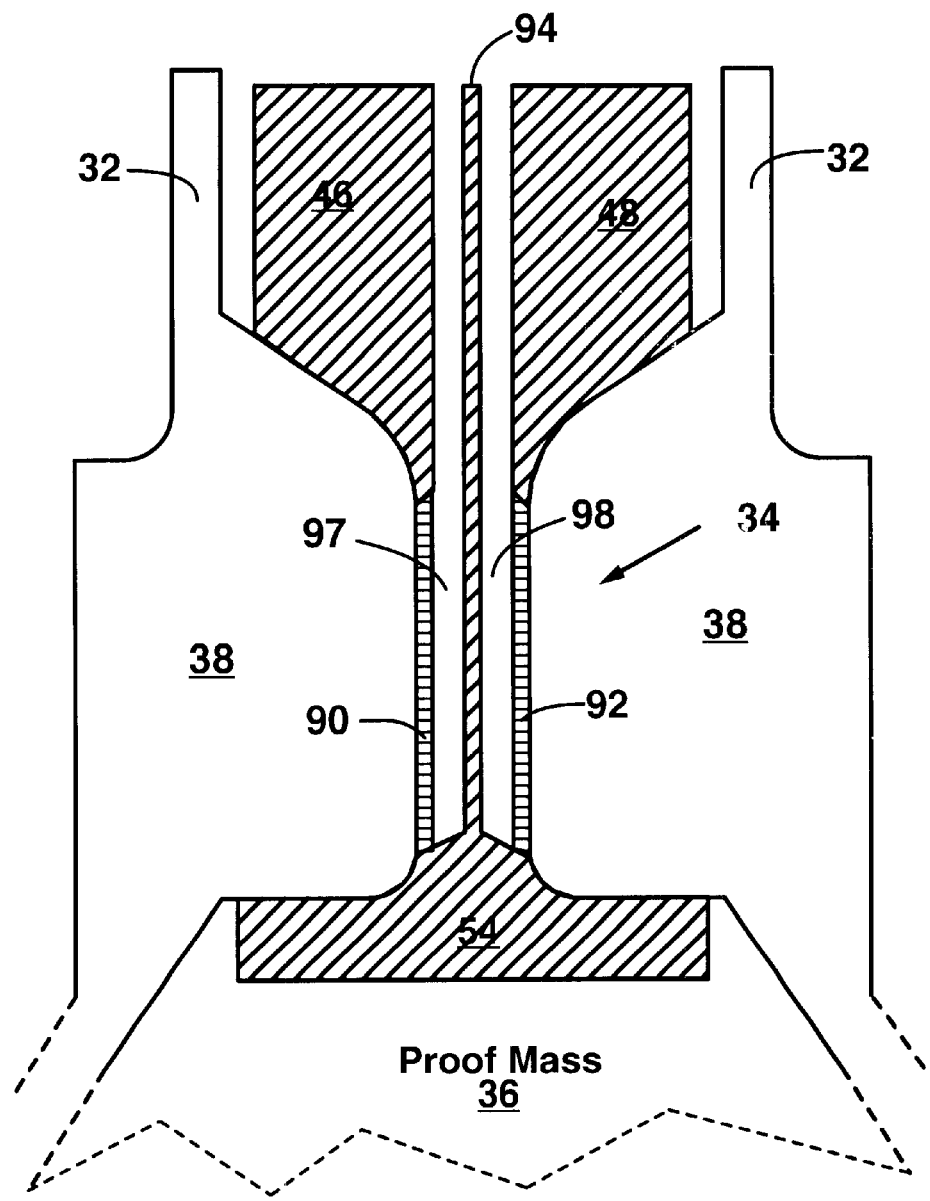
FIG. 12A shows a closeup view of an accelerometer according to a preferred embodiment of the present invention having two piezoresistors in the flexure.

FIG. 12A shows a closeup view of the flexure 34 according to a preferred embodiment of the present invention. FIG. 12 is illustrates the electronic structure of the embodiment. The device has contact regions 46, 48 as in the embodiment of FIG. 4. The device has two piezoresistors 90, 92 on opposing side of the flexure. The piezoresistors 90, 92 respond oppositely to bending of the flexure 34 (i.e. one piezoresistor will increase in resistance and other piezoresistor will decrease in resistance when the flexure bends in a certain direction). A center-tap connection 94 is connected to the heavily doped region 54 on the proof mass. The center-tap connection 94, the contact regions 46, 48 and the region 54 are all heavily doped; the piezoresistors 90, 92 are lightly doped. Of course, the center-tap connection 94 must be insulated from the piezoresistors 90, 92. This can be accomplished by making regions 97, 98 of a conductivity type opposite from the piezoresistors 90, 92 and center-tap 94 (i.e. piezoresistors are junction-isolated). Although FIG. 12A is a top view, the piezoresistors 90, 92 preferably are not located on a top surface of the flexure; the piezoresistors are preferably located in the flexure sidewalls.

Figure 12B:
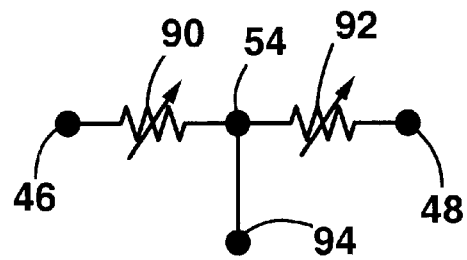
FIG. 12B shows an electrical equivalent schematic of the device of FIG. 12A.

FIG. 12B shows a simplified electrical schematic of the device of FIG. 12A. All the piezoresistors K, O, M, N are variable.

In order to accommodate the center-tap 94, the flexure must be somewhat wider than the flexure in the embodiments of FIGS. 2–4. For example, the flexure can be about 3 microns wide, and the center-tap connection 94 can be about 1 micron wide. This is somewhat undesirable as the wider flexure results in decreased sensitivity. However, this reduced sensitivity is offset by the use of two active piezoresistors 90, 92 (as compared to a single piezoresistor in the embodiment of FIGS. 2–4). It noted that the thickness and length of the flexure can be scaled smaller as micromachining techniques continue to improve.

Figure 13:
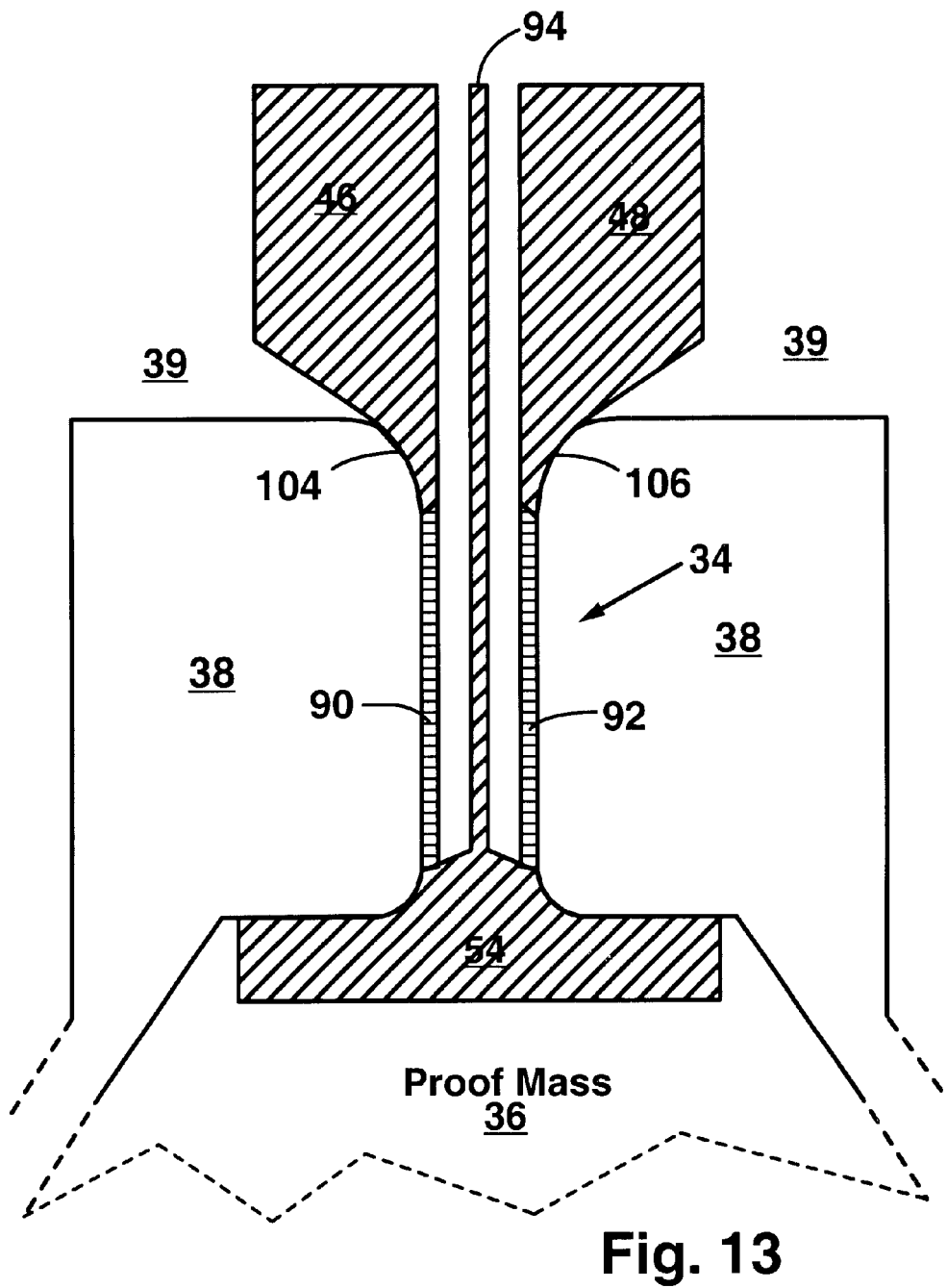
FIG. 13 Shows an alternative embodiment of the present invention in which the accelerometer having two piezoresistors does not have a strain-isolation pedestal.

FIG. 13 shows an alternative embodiment of the present invention having a center tap 94 and two piezoresistors 90, 92 but having no strain-isolation pedestal. The strain-isolation pedestal is preferred but now necessary in the embodiment having two piezoresistors and a center-tap 94. However, the joints 104, 106 should have a smooth curve with a radius of curvature of at least ¼ F.

Figure 14:
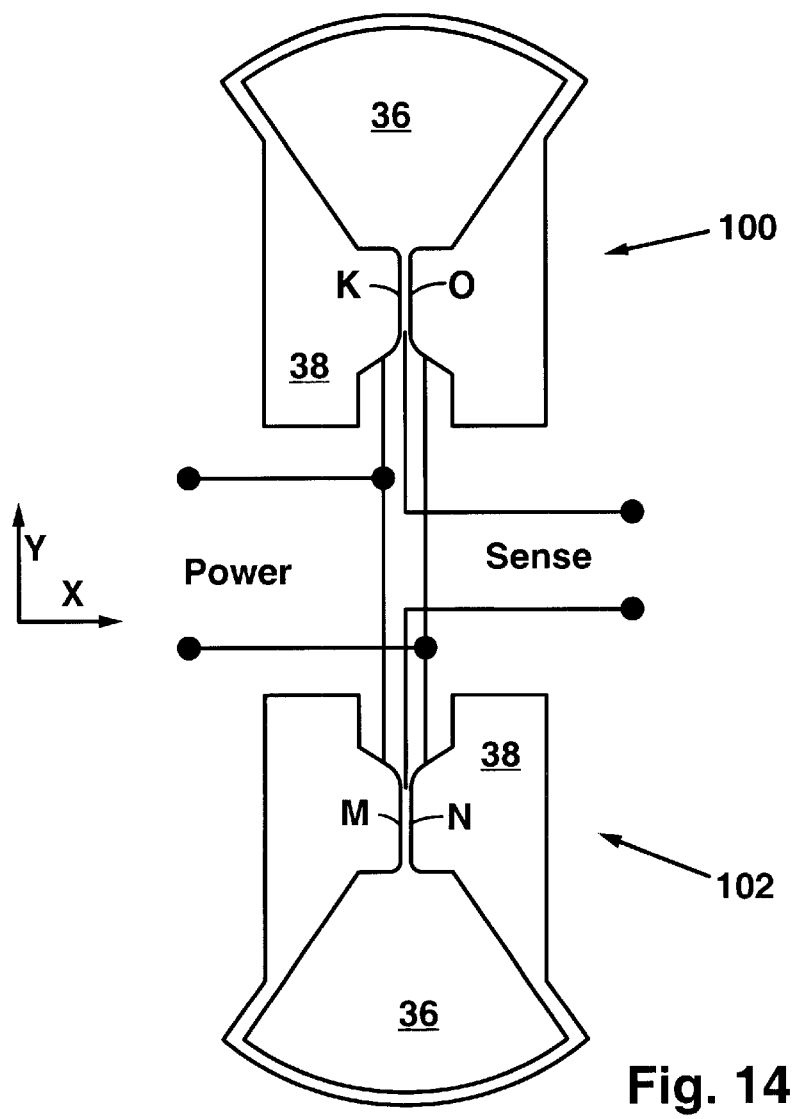
FIG. 14 shows a wheatstone bridge accelerometer circuit having two accelerometers like that shown in FIG. 12A.

FIG. 14 shows a particularly preferred embodiment of the present invention that uses two accelerometers 100, 102 like that shown in FIG. 12A in a Wheatstone bridge circuit. The accelerometers 100, 102 are oriented antiparallel. The accelerometers 100, 102 have piezoresistors K, O, M, N, which are preferably identical. The device of FIG. 14 does not require reference accelerometers.

Figure 15A:
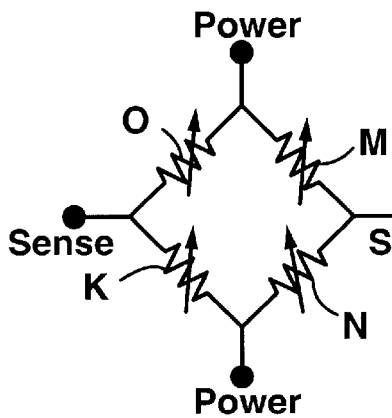
FIG. 15A shows an electrical equivalent schematic of the circuit of FIG. 14.
Figure 15B:
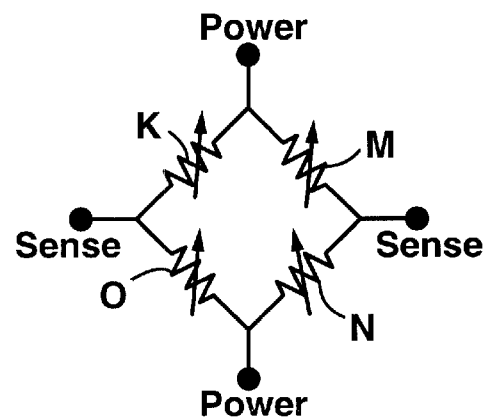
FIG. 15B shows an electrical schematic of an alternative electrical arrangement for the device of FIG. 14.

The piezoresistors K, O, M, N are preferably connected as shown in FIG. 15A. This arrangement provides high sensitivity to X-direction acceleration and rejection of signals from rotational acceleration. Alternatively, the piezoresistors are connected as shown in FIG. 15B. This arrangement provides high sensitivity to rotational acceleration and rejection of signals from X-direction acceleration.

A significant advantage of the embodiment of FIG. 12A is that the piezoresistors 90, 92 are more closely identical than the resistors in the embodiment of FIGS. 8 and 9. This is because the piezoresistors 90, 92 are made on the same flexure in the same processing (i.e. ion implantation) step. This provides benefits particularly in the embodiment of FIG. 14. For example, substrate strain offset errors and temperature variation errors are improved with the device of FIG. 14. Also, the need for post-processing (e.g. laser trimming) is reduced. Another big advantage of the embodiment of FIG. 14 is that sensitivity to Z-direction acceleration is greatly reduced. This is because piezoresistors K and O are closely identical and piezoresistors M and N are closely identical and these pairs experience the same strain during Z-direction acceleration.

Figure 16:
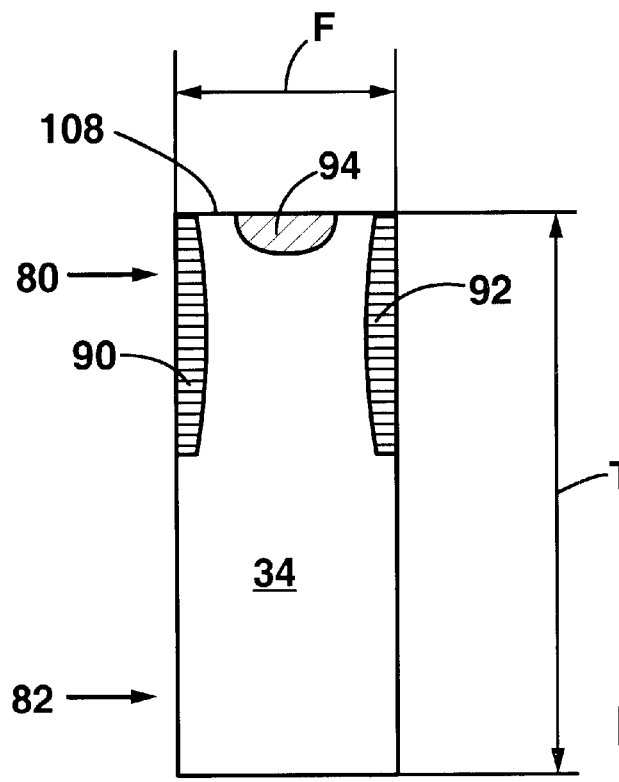
FIG. 16 shows a cross sectional view of the flexure of the device of FIG. 12A according to an alternative embodiment where the piezoresistors are confined to an upper portion of the flexure.

FIG. 16 shows a particularly preferred embodiment of the accelerometer of FIG. 12A where the piezoresistors are confined to an upper portion 80 of the flexure 34. FIG. 16 is a cross sectional view. Center-tap is preferably located on a top surface 108.

FIGS. 17A–17H Illustrate a preferred method for making the accelerometers and Wheatstone bridge devices of the present invention.

Figure 17A:
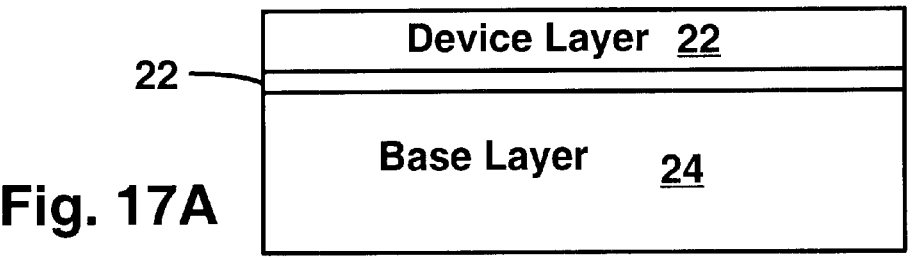
FIGS. 17A–17I illustrate a preferred technique for making the accelerometer of the present invention.

In FIG. 17A, a silicon substrate is provided having a device layer 22, a buried oxide layer 26 and a base layer 24. The buried oxide layer can be about 0.22 microns thick, and the device layer can be about 5–50 microns thick. Preferably, the device layer 22 is uniformly doped (e.g. 0.5 Ohm-cm n-type Phosphorus). Alternatively, if smaller accelerometers are desired, the device layer can be about 1–5 microns thick.

Figure 17B:
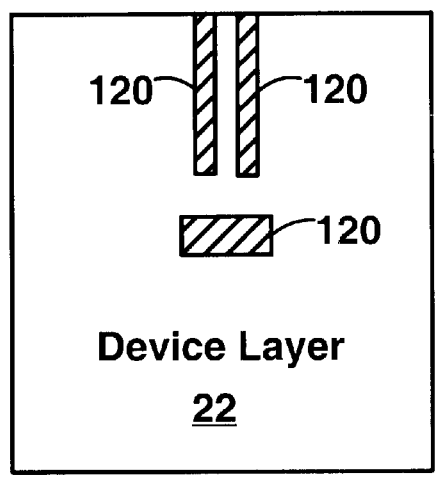

FIG. 17B is a top view of the next step in which heavily doped regions 120 are implanted. The regions are p++ type (e.g. boron doped to 85 Ohms/square). The regions 120 eventually form contact regions 46, 48, and 54 shown in FIG. 4.

Figure 17C:
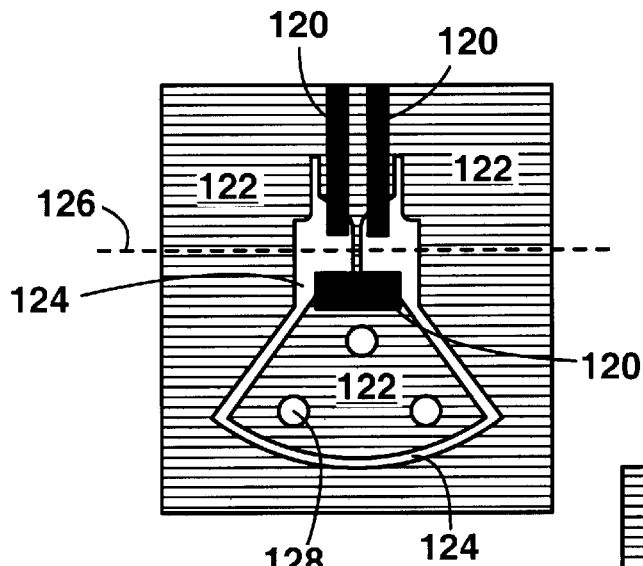

FIG. 17C shows a top view of a mask region 122 used to define a region exposed to a dry plasma etch (e.g. DRIE). The mask 122 is aligned with respect to the heavily doped regions 120 as shown. Unmasked regions 124 are exposed for etching. Preferably, holes 128 are provided in the area to become the proof mass so that the oxide layer under the proof mass is more easily etched in later steps. The holes 128 can be any shape.

Figure 17D:
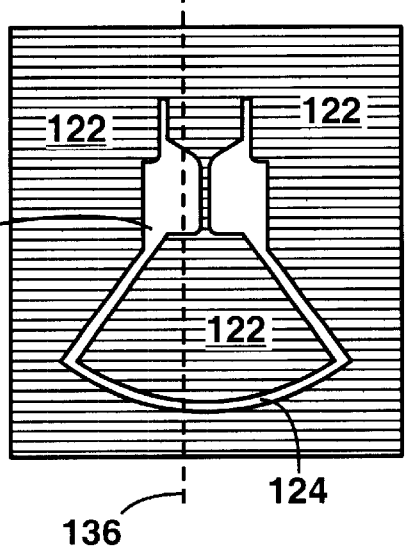

FIG. 17D shows the mask region 122 without the heavily doped regions 120. An important aspect of the present invention is that the mask 122 defines the exact shape of the pedestal, flexure, and proof mass. Therefore, the shape of the mask region 122 determines a radius of curvature at the smooth joints 40, 42 shown in FIG. 3. By appropriately shaping the mask region 122, any pedestal shape, flexure shape, or proof mass shape is possible. Also, any desired radius of curvature is possible for the smooth joints 40, 42 in FIG. 3.

Figure 17E:
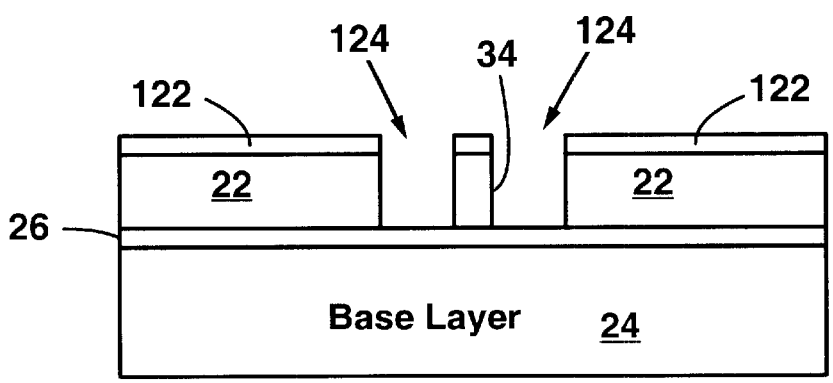

FIG. 17E shows a cross sectional view after the dry plasma etching step. The cross section cuts through the flexure 34 along line 126 in FIG. 17-C. Preferably, deep reactive ion etching (DRIE) capable of high aspect ratio etching (e.g. aspect ratios of 20–50) is used to etch the device layer. A particularly preferred method is the well-known Bosch process comprising many cyclical steps of sidewall passivation and bottom etching.

Figure 17F:
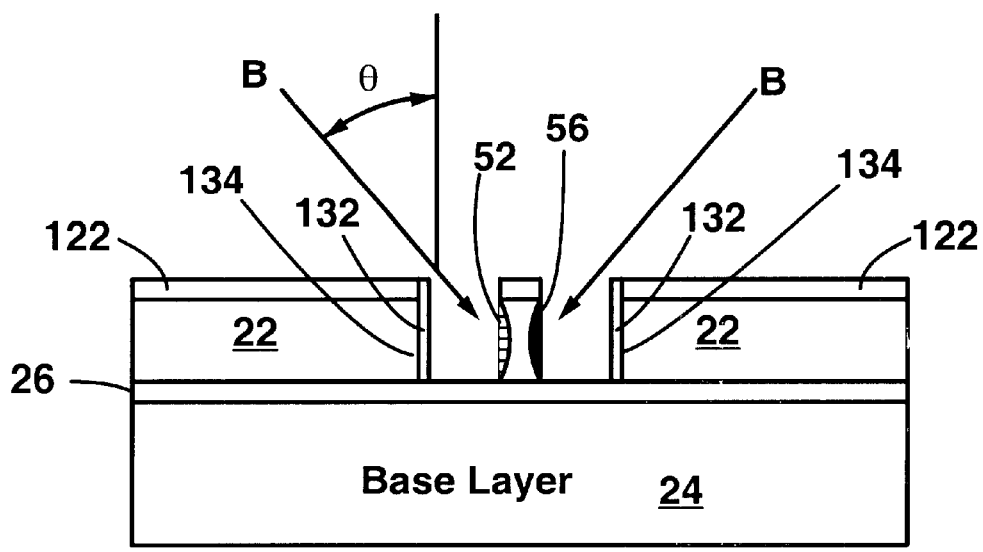

FIG. 17F shows the next step in making the device. Boron ions 132 are implanted at an angle θ into the sidewall of the flexure 34 to form a piezoresistor 52. Preferably, the angle q is in the range of 10–80 degrees; particularly, an angle of 31 degrees is preferred because this angle tends to minimize ion channeling. Next, the opposite sidewall is heavily implanted to form the heavily doped region 56 (shown in FIG. 4). It is important to point out that additional mask 132 should be provided on peripheral sidewalls 134 so that the peripheral sidewalls are not implanted. Ions implanted in the peripheral sidewalls 134 will tend to short-circuit the device.

Figure 17G:
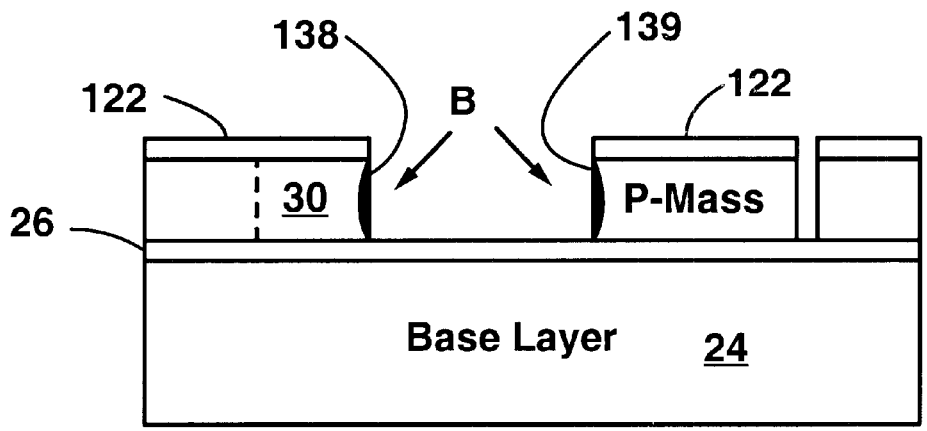

FIG. 17G shows a cross sectional view cut along line 136 in FIG. 17D illustrating the next step for making the device. Pedestal sidewall 138 and proof mass sidewall 139 are heavily implanted (e.g. p+ with boron) at an angle (e.g. in the range of 10–80 degrees, or 31 degrees) to form regions 50, 58 in the pedestal 30 and 57 in the proof mass, as shown in FIG. 4. The ions are directed parallel to the plane of the flexure so that ions are not implanted into the sidewalls of the flexure. The sidewall implant step of FIG. 17G is not necessary if the piezoresistor is confined to the upper portion of the flexure.

Figure 17H:
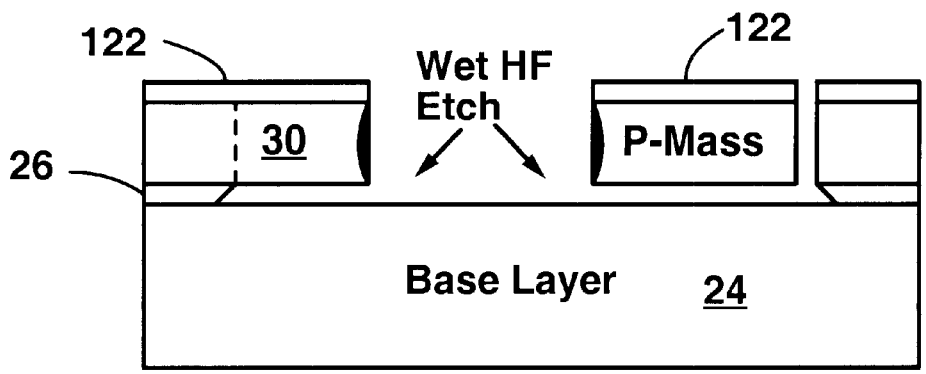
Figure 17I:
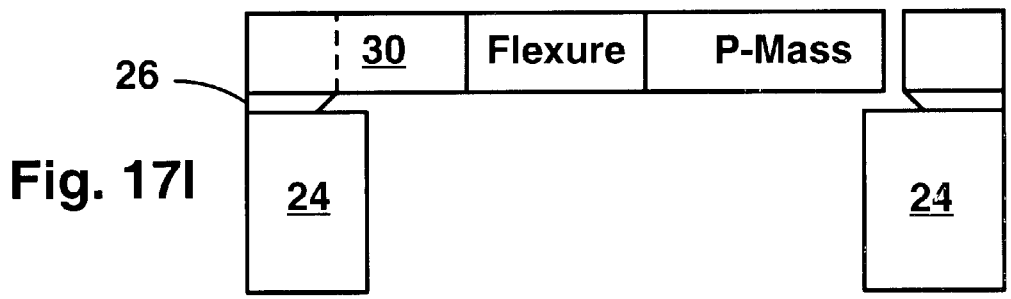

Next, in FIG. 17H, the buried oxide layer 26 is wet-etched. Optional holes 128 in FIG. 17C help to expose the buried oxide layer to etch solution. Critical point drying may be necessary to ensure that the proof mass 36 does not stick to the base layer 24. It is understood that all the implanted regions (heavily doped and piezoresistive) should be activated, annealed, and passivated.

Finally, metallic contacts are made to the heavily doped contact regions 46, 48. Preferably, the metallic contacts are spaced at least 100 microns from the flexure. This ensures that temperature-induced strain between the device layer and metallic contacts does not affect the flexure. Also, the device can be conformally coated with oxide for passivation, as is known in the art. Further, as shown in the side view of FIG. 17I, the base layer 24 can be etched from under the pedestal, flexure and proof mass.

It is noted that the device can be released using techniques other than wet etching of the buried oxide layer. For example, a bonded cavity release technique can be used. In this known technique, the base layer 24 has etched cavities aligned under the pedestal, flexure and proof mass. After DRIE etching the device layer 22, the buried oxide layer 26 is DRIE etched, releasing the device with the buried oxide layer attached to the underside of the pedestal, flexure and proof mass. Other appropriate release techniques are also known in the art.

Figure 18:
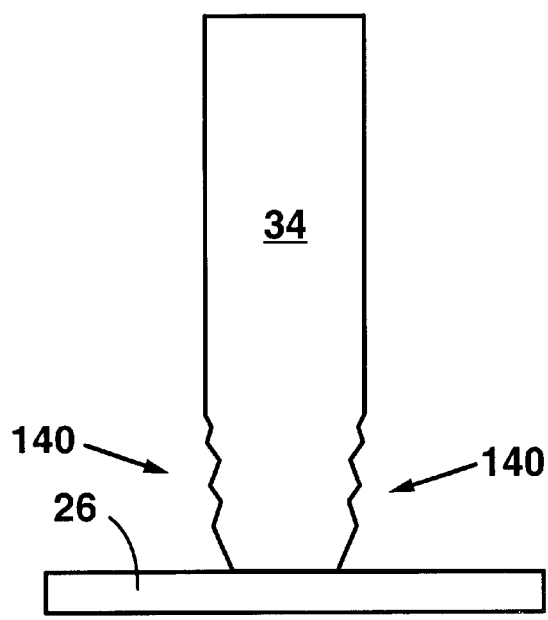
FIG. 18 illustrates an important consideration in making the accelerometers according to the preferred technique.

FIG. 18 illustrates an important phenomenon known in the art of dry plasma etching and the Bosch process. When the etch reaches a buried oxide layer 26, a bottom portion 140 of the etched layer (i.e. the device layer) can become very rough and damaged. If the piezoresistor 52 is implanted into the rough bottom portion 140, it will have a relatively high noise floor, and will have unpredictable characteristics. For this reason, it is desirable to confine the piezoresistor 52 to the upper portion 80 of the flexure, as shown in FIG. 11.

Figure 19A:
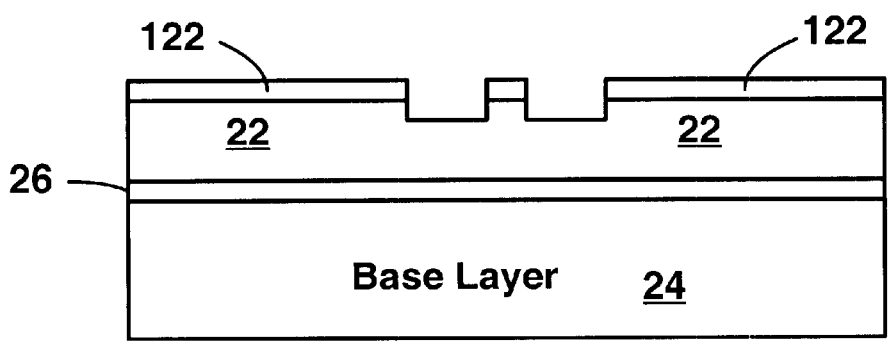
FIGS. 19A–19C illustrate how to make a flexure sidewall piezoresistor so that it is confined to an upper portion of the sidewall.
Figure 19B:
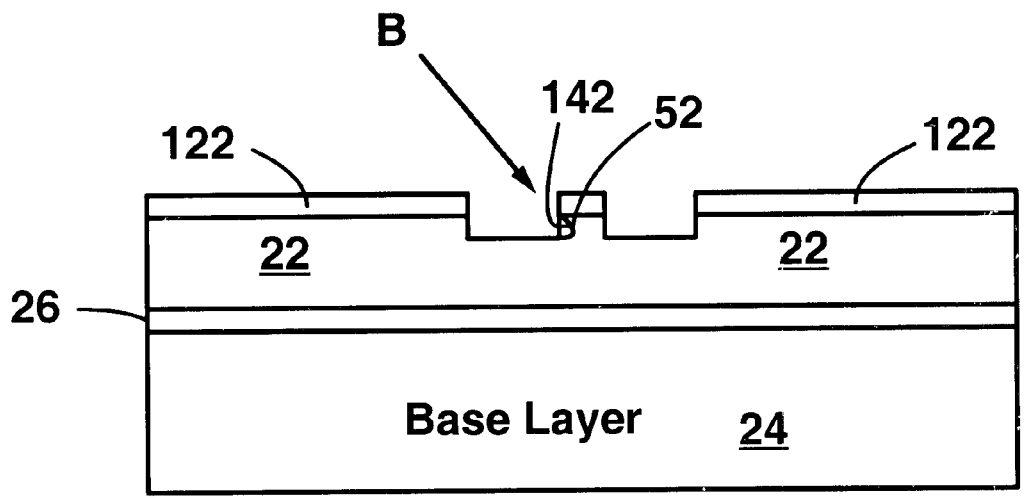
Figure 19C:
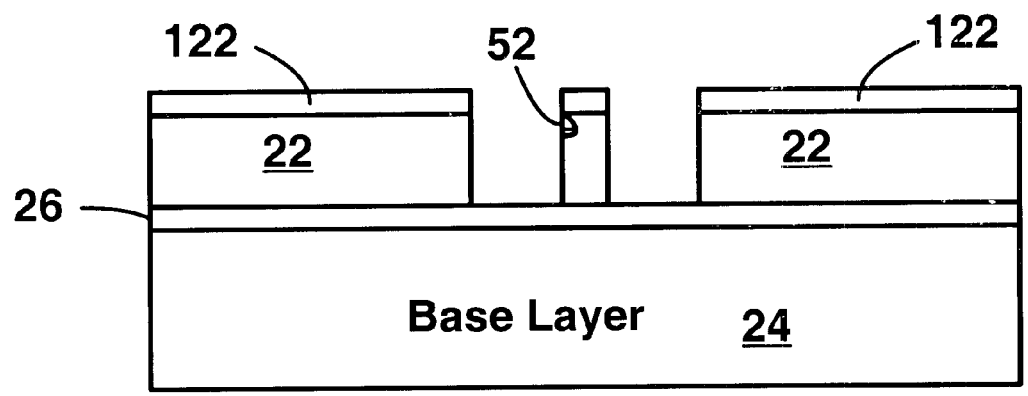

FIGS. 19A–19C illustrate how the piezoresistor is made so that it is confined in the upper portion 80 only. In FIG. 19A, the device layer 22 is partially etched using a dry plasma etching technique. The depth of the etch in FIG. 19A determines the portion of the flexure sidewall which will have the piezoresistor. Next, in FIG. 19B, with the device layer only partially etched, sidewall 142 is ion implanted at an angle, forming the piezoresistor 52. Finally, in FIG. 19C, the dry etch is completed to the buried oxide layer 26.

The accelerometer of FIG. 12A can be made by lightly implanting dopant into both sidewalls of the flexure. The center tap 94 can be made during the first heavy implantation step shown in FIG. 17B.

Preferably, the devices of the present invention are made of silicon. However many other materials can be used such as quartz and other crystalline materials, ceramics, and other semiconductors such as gallium arsenide.

It is understood that the physical dimensions given for the accelerometers are scalable so that smaller devices are possible as micromachining techniques improve. Generally, the minimum sizes possible are fundamentally limited by the flexure thickness. It is expected that the flexure can be made as thin as 0.1 micron It will be clear to one skilled in the art that the above embodiment may be altered in many ways without departing from the scope of the invention. Accordingly, the scope of the invention should be determined by the following claims and their legal equivalents.

What is claimed is:

1. A micromachined accelerometer, comprising:
   a) a base layer;
   b) an unreleased portion attached to the base layer, wherein the unreleased portion has, a hole;
   c) a strain-isolation pedestal attached to the unreleased portion and extending into the hole;
   d) a flexure attached to the strain-isolation pedestal, wherein the flexure is oriented in a plane perpendicular to the base layer so that the flexure bends in a direction parallel with the base layer, and wherein the flexure has a width F which is narrower than a width W of the pedestal; and
   e) a proof mass attached to the flexure opposite the strain-isolation pedestal;
   wherein the strain-isolation pedestal, the flexure and the proof mass are released from the base layer.

2. The accelerometer of claim 1 wherein the strain-isolation pedestal has a width 1W in a range 2F<W<4T, where F is a thickness of the flexure, and where T is a thickness of the strain-isolation pedestal.

3. The accelerometer of claim 1 wherein the strain-isolation pedestal has a width W in a range 4F<W<2T, where F is a thickness of the flexure, and where T is a thickness of the strain-isolation pedestal.

4. The accelerometer of claim 1 wherein the strain-isolation pedestal has a length D in a range 0.25T<D<4W, where T is a thickness of the strain-isolation pedestal, and where W is a width of the strain-isolation pedestal.

5. The accelerometer of claim 1 wherein the strain-isolation pedestal has a length D in a range 0.5T<D<2W, where T is a thickness of the strain-isolation pedestal, and where W is a width of the strain-isolation pedestal.

6. The accelerometer of claim 1 wherein the strain-isolation pedestal has a thickness T in the range 5–50 microns.

7. The accelerometer of claim 1 wherein the flexure has a thickness F in the range of 1–10 microns.

8. The accelerometer of claim 1 wherein the flexure has an aspect ratio in the range of 3–30.

9. The accelerometer of claim 1 wherein the base layer is etched from under the pedestal, flexure and proof mass.

10. The accelerometer of claim 1 wherein the pedestal and flexure are attached at a first smooth joint, and the proof mass and flexure are attached at a second smooth joint, and the smooth joints have a radius of curvature of at least 0.25 F.

11. The accelerometer of claim 1 wherein the pedestal and flexure are attached at a first smooth joint, and the proof mass and flexure are attached at a second smooth joint, and the smooth joints have a radius of curvature of at least 0.5 micron.

12. The accelerometer of claim 1 further comprising a piezoresistor located in a sidewall of the flexure.

13. The accelerometer of claim 12 wherein the piezoresistor is confined to the upper ½ of the flexure.

14. The accelerometer of claim 12 wherein the piezoresistors are confined to the upper 1/10 of the flexure.

15. A micromachined accelerometer, comprising:
   a) a base layer;
   b) an unreleased portion attached to the base layer, wherein the unreleased portion has a hole;
   c) a strain-isolation pedestal attached to the unreleased portion and extending into the hole, wherein the strain-isolation pedestal is attached to the unreleased portion;
   d) a flexure attached to the strain-isolation pedestal, wherein the flexure is oriented in a plane perpendicular to the base layer so that the flexure bends in a direction parallel with the base layer, wherein the flexure has a thickness F that is narrower than a width W of the pedestal, and wherein the flexure has first sidewall and a second sidewall;

e) a proof mass attached to the flexure opposite the strain-isolation pedestal;

f) a first piezoresistor located in the first sidewall;

g) a second piezoresistor located in the second sidewall, wherein the first piezoresistor and the second piezoresistor are electrically connected in series; and h) a center-tap electrical connection to the point where the first piezoresistor and the second piezoresistor are connected;

wherein the strain-isolation pedestal, the flexure and the proof mass are released from the base layer.

16. The accelerometer of claim 15 wherein the center tap comprises a heavily doped path extending along a top of the flexure.

17. The accelerometer of claim 15 wherein the strain-isolation pedestal has a width W in a range 2F<W<4T, where F is a thickness of the flexure, and where T is a thickness of the strain-isolation pedestal.

18. The accelerometer of claim 15 wherein the strain-isolation pedestal has a width W in a range 4F<W<2T, where F is a thickness of the flexure, and where T is a thickness of the strain-isolation pedestal.

19. The accelerometer of claim 15 wherein the strain-isolation pedestal has a length D in a range 0.25T<D<4W, where T is a thickness of the strain-isolation pedestal, and where W is a width of the strain-isolation pedestal.

20. The accelerometer of claim 15 wherein the strain-isolation pedestal has a length D in a range 0.5T<D<2W, where T is a thickness of the strain-isolation pedestal, and where W is a width of the strain-isolation pedestal.

21. The accelerometer of claim 15 wherein the strain-isolation pedestal has a thickness T in the range 5–50 microns.

22. The accelerometer of claim 15 wherein the flexure has a thickness F in the range of 1–10 microns.

23. The accelerometer of claim 15 wherein the flexure has an aspect ratio in the range of 3–30.

24. The accelerometer of claim 15 wherein the base layer is etched from under the pedestal, flexure and proof mass.

25. The accelerometer of claim 15 wherein the pedestal and flexure are attached at a first smooth joint, and the proof mass and flexure are attached at a second smooth joint, and the smooth joints have a radius of curvature of at least 0.25 F.

26. The accelerometer of claim 15 wherein the pedestal and flexure are attached at a first smooth joint, and the proof mass and flexure are attached at a second smooth joint, and the smooth joints have a radius of curvature of at least 0.5 micron.

27. The accelerometer of claim 15 wherein the piezoresistors are confined to the upper ½ of the flexure.

28. The accelerometer of claim 15 wherein the piezoresistors are confined to the upper ¹/₁₀ of the flexure.

* * * * *